March 14, 1933.  W. MOSCHEL  1,901,524
CHLORINATING APPARATUS
Original Filed Sept. 13, 1929
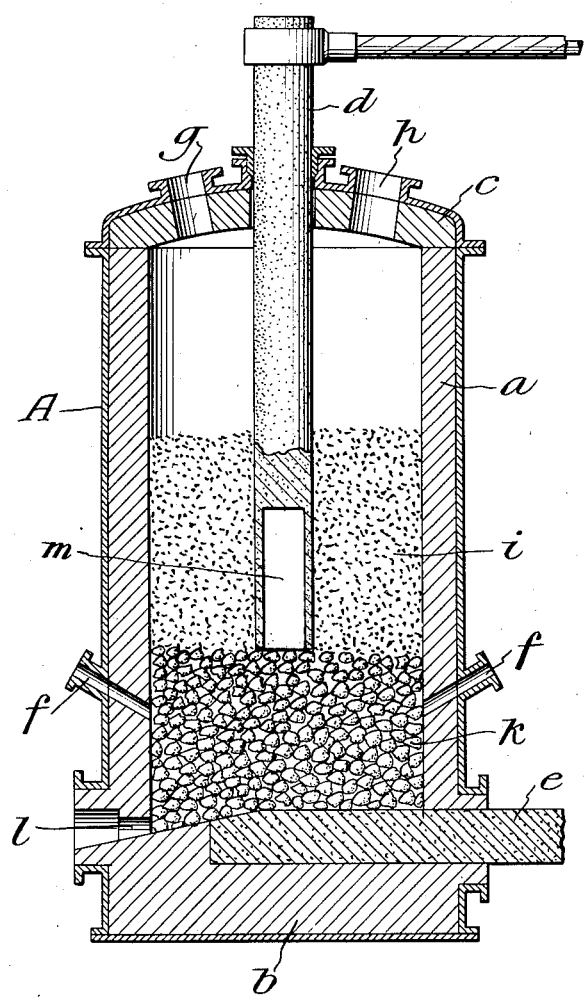
Inventor:
Wilhelm Moschel,
By Byrnes Townsend & Potter,
Attorneys.

Patented Mar. 14, 1933

1,901,524

UNITED STATES PATENT OFFICE

WILHELM MOSCHEL, OF BITTERFELD, GERMANY, ASSIGNOR, BY MESNE ASSIGNMENTS, TO MAGNESIUM DEVELOPMENT CORPORATION, A CORPORATION OF DELAWARE

CHLORINATING APPARATUS

Original application filed September 13, 1929, Serial No. 392,462, and in Germany October 4, 1928. Divided and this application filed December 2, 1930. Serial No. 499,606.

This invention relates to chlorinating apparatus to be used in connection with processes for the preparation of anhydrous metal chlorides, and is a divisional application of my application Ser. No. 392,462 filed September 13, 1929 and entitled "Process for producing anhydrous magnesium chloride".

Various processes are known for the conversion of metal oxides and similar compounds such as carbonates or silicates into the corresponding molten anhydrous chlorides by means of chlorine or chlorinating gases in the presence of carbon and at temperatures about or above the melting point of such chlorides. However, most of these processes are attended with the drawback that the conversion proceeds excessively slowly and even remains incomplete in the end. This is due to the fact that the reactive surface of the solid bodies to be acted upon by the chlorine, viz. mixtures— either briquetted and coked or not—of the metal oxide with various forms of carbon is small, and that the molten chloride initially formed on the surface of such solid bodies envelops the latter while combining with the remaining unreacted substance so as to form a crust or paste which prevents further access of the chlorine to the interior of said bodies. But even if such molten chloride be removed, it is always contaminated with certain amounts of unconverted oxide or carbon and thus cannot yield a pure final product.

Similar conditions prevail when it is a question of producing molten anhydrous metal chlorides from metal chlorides still containing water of crystallization in a chlorinating atmosphere in the presence of carbon. When using the term "chlorination" or "chlorinating" in the following, also dehydrating processes of this kind are considered.

An object of the present invention therefore is to provide an apparatus which will enable chlorination to proceed smoothly and completely by allowing the impure molten chloride formed on the surface of the solid starting material to flow off immediately, and subsequently to convert said impure chloride into a final product of excellent purity.

The invention will be described with particular reference to the production of pure anhydrous magnesium chloride from a crude mixture of pieces of magnesite and pieces of carbon; but it will be understood that it is by no means limited to the employment of starting material of this kind and when in this form, but is equally applicable to the use of compounds of other metals forming molten chlorides, as well as to the treatment of briquetted and coked mixtures of such compounds with carbonaceous substances lending themselves to such chlorinating reactions.

According to the present invention the reaction in question is carried out in a special apparatus which provides for passing chlorine in uniform distribution into a loose mixture of pieces of magnesite and pieces of carbon, preferably wood charcoal or peat charcoal (or loosely arranged briquettes of an intimate coked mixture of magnesite and such carbon, as the case may be) at temperatures closely about or above the melting point of magnesium chloride, and for immediately removing the fused magnesium chloride formed in a direction substantially opposed to that of the ascending current of chlorine so as to convert any traces of oxide still remaining in such molten chloride, while continually maintaining the most suitable temperatures in the different stages of the reaction.

For this purpose, the mixture of pieces of magnesite and pieces of wood charcoal is placed on an electrically heated pervious layer of carbon and is there caused to react at a temperature of 700–900° C., with chlorine which is, for the purpose of uniform distribution, best passed through this layer of carbon from below. The resulting magnesium chloride fuses immediately, runs through the heated layer of carbon, and collects in its lower portion from whence it can be withdrawn from time to time in the fused state and in an anhydrous and oxide-free condition. The reaction itself furnishes sufficient heat to maintain the temperature necessary for the reaction and it is consequently sufficient once and for all merely to preheat the reaction material to the necessary temperature. This preheating is effected by introducing suitable heating elements into the reaction material. Preferably, the lower portion of the current lead, passed from above through the reaction material, for electrically heating the layer of carbon is in the form of a heating element, e. g., a carbon rod or carbon tube; if necessary, a plurality of current leads (three phase current heating) can be employed.

The pervious heated layer of carbon situated beneath the reaction material and acting as a sieve serves to enable the liquid magnesium chloride formed to be run off rapidly. It is therefore advantageously formed of rather coarse pieces of a mechanically resistant carbon that is electrically conductive and chemically inert—for example, fragments of hard carbon electrodes.

In order more clearly to understand the invention reference is made to the accompanying drawing which shows diagrammatically and by way of example one embodiment of apparatus suitable for carrying out the invention.

In said drawing A indicates a closed shaft which is lined with fire-proof brickwork $a$, $b$, $c$. The shaft is filled for about one third of the way up with coarse-grained carbon $k$ which constitutes the pervious layer of carbon. The electric current is supplied through the leads $d$ and $e$. The upper lead $d$ has its lower portion in the form of a tube $m$ for the purpose of effecting, owing to increased resistance, the heating up of the reaction material $i$, a mixture of magnesite and pieces of reactive charcoal, lying upon the layer $k$. The chlorine is passed into the layer $k$ through the pipe $f$ and the reaction material is fed in at $g$. An opening $h$ serves for the removal of the waste gases. The finished magnesium chloride collects in the bottom portions of the layer $k$ and is from time to time run off at $l$ in the liquid state.

I claim:

1. A chlorinating apparatus comprising a closed shaft provided with a fire-proof lining, a tapping hole in the proximity of the bottom of said shaft, at least one gas inlet in the lower part of said shaft but above said tapping hole, a layer of coarse pieces of mechanically resistant and chemically inert carbon in the bottom of said shaft extending upwards somewhat beyond said gas inlet, a feeding aperture and a gas outlet in the ceiling of said shaft, a free reaction space in the upper part of said shaft, an electrode in the bottom of said shaft and in contact with said carbon layer and at least one rod-shaped electrode vertically inserted in the ceiling of said shaft and extending through said free reaction space so as to contact with said carbon layer.

2. A chlorinating apparatus comprising a closed shaft provided with a fire-proof lining, a tapping hole in the proximity of the bottom of said shaft, at least one gas inlet in the lower part of said shaft but above said tapping hole, a layer of coarse pieces of mechanically resistant and chemically inert carbon in the bottom of said shaft extending upwards somewhat beyond said gas inlet, a feeding aperture and a gas outlet in the ceiling of said shaft, a free reaction space in the upper part of said shaft, an electrode in the bottom of said shaft and in contact with said carbon layer, and at least one rod-shaped electrode vertically inserted in the ceiling of said shaft, and extending through said free reaction space so as to contact with said carbon layer, the lower portion of said rod-shaped electrode having the form of a tube.

3. A chlorinating apparatus for counter-current chlorination comprising a closed shaft provided with a fireproof lining, a layer of pieces of mechanically resistant carbon, which is chemically inert to the reacting materials, disposed in the bottom of the shaft and extending upwardly therein for a substantial portion of its length, the upper surface of said carbon layer forming with the walls of said shaft a reaction space, an electrode disposed in the bottom of said shaft and contacting said carbon layer, another electrode disposed in the upper portion of said shaft and contacting the upper surface of said carbon layer, means disposed in said shaft walls for supplying a gaseous reactant through said carbon layer, means disposed in said shaft wall for supplying non-gaseous reactant directed into said reaction space and upon said carbon layer and means for withdrawing from the bottom of said shaft the products of the reaction.

4. A chlorinating apparatus for counter current chlorination comprising a closed shaft provided with a fireproof lining, a layer of pieces of mechanically resistant carbon, which is chemically inert to the reacting materials, disposed in the bottom of the shaft and extending upwardly therein for a substantial portion of its length, the upper surface of said carbon layer forming with the walls of said shaft a reaction space, means for initially starting a reaction comprising an electrode disposed in the bottom of said shaft and contacting said carbon layer and another electrode disposed in the upper portion of said shaft and contacting the upper surface of said carbon layer, means disposed in said shaft walls for supplying a gaseous reactant through said carbon layer, means disposed in said shaft wall for supplying non-gaseous reactant directed into said reaction space and upon said carbon layer and means for withdrawing from the bottom of said shaft the products of the reaction.

5. A chlorinating apparatus for counter-current chlorination comprising a closed shaft, a gas inlet in the lower portion of said shaft, a layer of mechanically resistant and chemically inert carbon in said shaft extending upwards beyond said gas inlet, an electrode disposed in the bottom of said shaft in contact with the carbon layer, and an electrode extending into the top of said shaft into contact with said carbon layer, said top electrode being tubular in form adjacent its lower end whereby its resistance is increased.

6. A chlorinating apparatus comprising upper and lower electrodes arranged in contact with a mechanically resistant and chemically inert carbon layer, at least one of said electrodes being reduced in cross section over a portion of its length, whereby its resistance is increased.

In testimony whereof I have hereunto set my hand.

WILHELM MOSCHEL.